UNITED STATES PATENT OFFICE.

CONRAD SEMPER, OF PHILADELPHIA, PENNSYLVANIA.

PROCESS OF GRINDING CAUSTIC SODA.

SPECIFICATION forming part of Letters Patent No. 318,044, dated May 19, 1885.

Application filed March 23, 1885. (No specimens.)

*To all whom it may concern:*

Be it known that I, CONRAD SEMPER, a citizen of the United States of America, residing in Philadelphia, in the State of Pennsylvania, have invented a certain new and useful Improvement in the Process of Grinding or Triturating Caustic Soda, of which improvement the following is a specification.

As is well known, the deliquescence of caustic soda, when exposed to the air, has proved a difficulty in preparing a powdered or granulated article therefrom for the market. It has been attempted to overcome this difficulty by grinding the caustic soda in heated apparatus, and Letters Patent of the United States, No. 243,939, have been granted for this process to William J. Menzies, assignor of one-half interest to G. T. Lewis, in which patent reference is made to English Letters Patent No. 4,274, issued under date of October 21, 1879.

I am also aware that Letters Patent of the United States, No. 286,132, have been granted to Frank D. Harned, assignor to Clement B. Wainwright, Israel R. Wainwright, and Joseph R. Wainwright, for a process in which the inventor claims to overcome the tendency of deliquescence of caustic soda by mixing therewith, after breaking it up and before grinding, a certain quantity of dry carbonate of soda.

The process of grinding the caustic soda in heated apparatus is costly and difficult, while the addition of carbonate of soda, although not so expensive nor difficult, is yet unnecessarily costly.

I have discovered that if caustic soda, after it has been broken up in the usual way, before feeding it into the mill is covered with a thin layer of powdered anhydrous or dry sulphate of soda, the caustic soda thus treated can be easily pulverized without the application of heat in an ordinary apparatus suitable for such purposes—such as a disintegrator. The sulphate of soda in this state is very absorbent, and keeps the caustic soda covered therewith from deliquescing. I preferably employ for this purpose the dry salt-cake as it comes from the roaster-furnaces, and it should be as nearly free from salt or sodium chloride as possible, and must not contain any free sulphuric acid. Any other dry or anhydrous sulphate of soda can, however, be used with equal advantage. The best results are obtained when the dry sulphate of soda is in a finely-powdered condition, as it is then best adapted to envelop the pieces of caustic soda before grinding, so as to prevent its deliquescence.

I have found that four per cent. of this sulphate of soda is a sufficient quantity, but I do not confine myself to this amount, but can with good results use a smaller or larger proportion.

The advantage of the use of dry sulphate of soda is that although it is quite as inactive when mixed with the caustic soda as carbonate of soda, it is at the same time much more eager to absorb moisture, and on this account a better preventive against the deliquescence of the caustic soda, and it is much cheaper. It does not injure the caustic soda, as the latter, as used in commerce, already contains sulphate of soda in a larger or smaller degree, and the proportion is only slightly increased by my process.

Having thus described the object of my improvement, what I claim as new, and desire to secure by Letters Patent, is—

The hereinbefore-described improvement in the process of grinding or triturating caustic soda or caustic alkali at ordinary temperatures, which improvement consists in adding to the broken mass of caustic soda ground salt-cake or dried sulphate of soda, and grinding and bolting the mixture, substantially as and for the purpose described.

CONRAD SEMPER.

Witnesses:
JOHN RODGERS,
M. H. ALBERGER.